Patented Aug. 23, 1938

2,127,905

UNITED STATES PATENT OFFICE 2,127,905

PROCESS FOR BREAKING PETROLEUM EMULSIONS

Melvin De Groote, University City, Mo., assignor to The Tret-O-Lite Company, Webster Groves, Mo., a corporation of Missouri No Drawing. Application September 25, 1937, Serial No. 165,684

14 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated for use in my process consists of an ester derived from a polycarboxylated acid and is of the kind in which at least one carboxylic hydrogen atom has been replaced by a residue derived from a hydroxylated fatty acid body, and at least one other carboxylic hydrogen atom attached to the same acid radical has been replaced by an amine radical characterized by having present in place of an amino hydrogen atom, at least one substituent radical consisting of a poly-hydroxy alkyl or poly-hydroxy alkyl-oxy-alkyl residue. The above described ester is further characterized by the fact that the linkage between the polycarboxy acid residue or residues and the amine radical is an ester linkage involving at least one of the hydroxyl radicals of the poly-hydroxy alkyl or poly-hydroxy alkyl-oxy-alkyl radical or radicals previously referred to.

The expression "fatty acid" as herein employed, refers to the fatty acids of commerce which are sometimes referred to as higher fatty acids, and contain at least 10 carbon atoms and generally not more than 24 carbon atoms. They are characterized by the fact that saponification with alkali yields soaps.

It is well known that hydroxylated fatty bodies, such as ricinoleic acid, monoricinolein, diricinolein, triricinolein, oxidized castor oil, and the like, can be reacted with a polybasic carboxy acid so as to yield an acid ester of such carboxy acids. The commonest examples of the polybasic carboxy acids are succinic, malic, fumaric, citric, maleic, adipic, tartaric, glutaric, diphenic, naphthalic, oxalic, etc. Needless to say, the anhydrides of the polybasic carboxy acids, such as phthalic anhydride, maleic anhydride, etc., may be employed as advantageously or even more advantageously than the acids themselves. In view of their low cost, the most available polybasic carboxy acids are oxalic acid, phthalic acid, maleic acid, citric acid, succinic acid, malic acid, and tartaric acid. In addition to the fatty materials previously referred to, one may employ hydrostearic acid or its various esters or glycerides. Similarly, one may employ hydroxylated fatty acids or fatty materials obtained by oxidation processes, such as treatment with permanganate, organic peroxides, air, oxygen, ozone, etc. Hydrogenated castor oil, of course, may be employed.

One of the most satisfactory polybasic carboxy acids is phthalic acid, which is preferably employed in the form of its anhydride. Ricinoleic acid is indicated by the following formula:

When reaction takes place between phthalic anhydride and ricinoleic acid, the resulting product is a substituted ricinoleic acid in which the phthalic acid residue has replaced the alcoholiform hydroxyl of ricinoleic acid. The product may be indicated by the following formula:

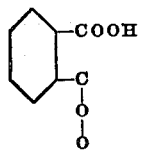

Castor oil consists essentially of the triglyceride of ricinoleic acid and may be indicated by the following formula:

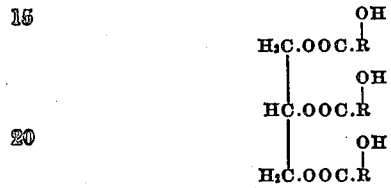

It is apparent that triricinoleic can be reacted with one, two, or three moles of phthalic anhydride, so as to produce materials which may be referred to as monophthalated triricinolein, diphthalated triricinolein, and triphthalated triricinolein. It is also obvious that one mole of phthalic anhydride may react with one mole of triricinolein to give a neutral phthalated compound which may be indicated by the following formula.

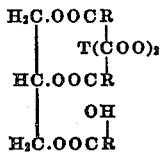

Such a neutral phthalated castor oil is not suitable for subsequent reaction with an amine, unless the residual alcoholic hydroxyl shown in the formula immediately above is reacted with another mole of phthalic anhydride, to leave at least one free carboxyl.

If, in the formulas referred to above, phthalic acid is replaced by a tribasic acid, such as citric acid, then it is obvious that there may be present one or more residual carboxyl radicals which may remain as such or be converted by reaction with a suitable base, such as caustic soda, sodium bicarbonate, amylamine, or ethanolamine, into a salt, or by reaction with an alcohol, such as ethyl alcohol or glycerine, into an ester. For sake of brevity, further discussion of such acids or acid esters and their preparation will be left to usual sources of information, and reference is made particularly in this connection to U. S. Patent No. 1,976,602, dated October 9, 1936, to Melvin De Groote, Wilbur C. Adams, and Bernhard Keiser.

In the case of a tribasic carboxy acid, such as citric acid, it is obvious that compounds such as dibasic citric acid monoethyl ester or dibasic citric acid sodium salt or dibasic citric acid amylamine salt may be considered as representing a polybasic acid, for instance a dibasic acid, and simply treated as the absolute functional equivalent of an ordinary dibasic acid, such as oxalic acid, maleic acid, or the like.

If a polybasic carboxy acid is indicated by the formula:

$$HOOC(T)(COOH)_n$$

in which T represents the polybasic carboxy acid residue and $n$ represents the numeral one or two, then the reaction product with a hydroxylated fatty acid body, and more particularly a triglyceride, may be indicated by the following:

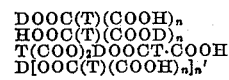

where D represents a hydroxylated fatty acid body residue, and $n'$ is the numeral 2 or 3. There are also possible other simple obvious functional equivalents of the above formulas which would represent, generally speaking, simple variants, especially if derived from fatty acids, mono- and diglycerides.

The demulsifying agent employed in the present process is obtained by reaction between an acid ester of the kind previously described and an amine of the kind in which at least one amino hydrogen atom has been replaced by a polyhydroxylated alkyl residue or alkyl-oxy-alkyl residue, and is further characterized by the fact that the reaction involves esterification between at least one residual carboxylic hydrogen of the acid ester previously described, and at least of one of the hydroxyl radicals of one or more of the polyhydroxyl alkyl or alkyl-oxy-alkyl radicals previously referred to.

There are various well-known methods for producing amines characterized by having present at least one polyhydroxylated alkyl or alkyl-oxyalkyl radical in place of at least one amino hydrogen atom. Examples are glyceryl amines which can be prepared by the reaction of ammonia or ammonium hydroxide on glyceryl halohydrins, and more particularly, glyceryl monochlorhydrin. Examples are the following:

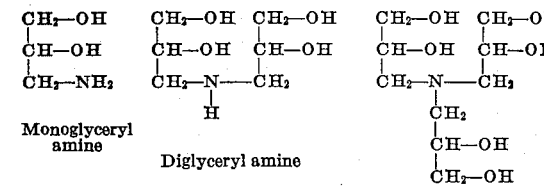

If instead of employing ammonia, one employs an alkylamine, such as monoamylamine or diamylamine, then compounds are formed in which one or both of the amino hydrogens of monoglycerylamine are replaced by alkyl radicals. Reference is made to U. S. Letters Patent No. 2,042,621, dated June 2, 1936, to Olin. Examples of this last mentioned type are the following:

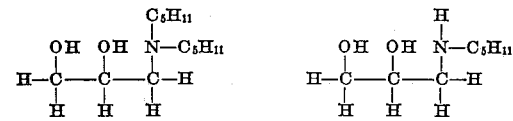

1-di-amyl amino propane-2,3-diol; or 1-di-amyl amino-2-hydroxy-3-propanol; di-amyl mono-glyceryl amine.

1-mono-amyl amino propane-2,-3-diol or 1-mono-amyl amino-2-hydroxy-3-propanol; mono-amyl mono-glyceryl amine.

Similarly, two moles of glycerol monochlorhydrin may react with one mole of monoamylamine to yield a product of the following type:

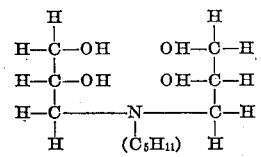

Mono-amyl diglyceryl amine.

It is not necessary that the reaction involving an amine, as distinguished from ammonia, be limited to alkyl-amines. It is just as satisfactory to use an aralkylamine, such as benzylamine or its homologues, such as phenyl ethyl amine, and the like. Examples of such reactions may be illustrated by the following reactions:

amines of the type in which at least one occurrence of R' represents a polyhydroxylated alkyl or alkyl-oxy-alkyl residue, and that the most important kind is the form in which at least one occurrence of R' represents the dihydroxy propyl radical $C_3H_5(OH)_2$.

The nature of the reaction or reactions involv-

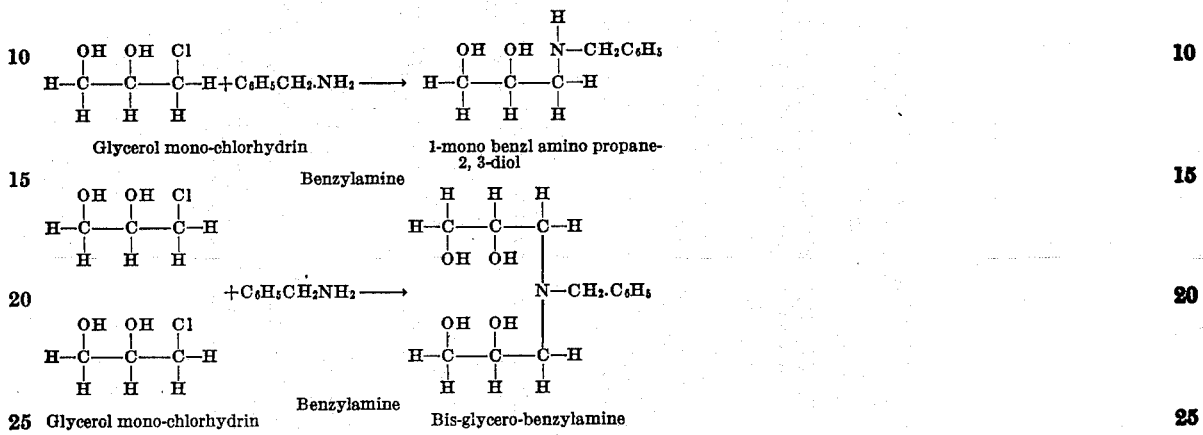

Glycerol mono-chlorhydrin   Benzylamine   1-mono benzl amino propane-2, 3-diol

Glycerol mono-chlorhydrin   Benzylamine   Bis-glycero-benzylamine

In addition to employing either alkyl amines or aralkylamines for reaction with glycerol chlorhydrin, one might employ alicyclic amines, such as cyclohexylamine, methylcyclohexylamine, dimethylcyclohexylamine, and the like. Arylamines, such as aniline, toluidine, naphthylamine, if converted by any method into analogous aryl glyceryl amines, and if reacted with the acid ester, would satisfactorily replace the unsubstituted glyceryl amines previously described.

In the manufacture of the amines previously described, reference has been made to reactions involving glycerol monochlorhydrin. As is well known, glycerol may be readily converted into diglycerol, which may be indicated by the following formula:

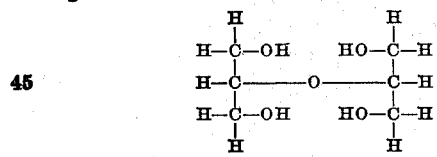

When such a product after being converted into a monochlorhydrin is reacted with monoamylamine, or with diamylamine, reaction takes place with the elimination of hydrogen chloride, which may combine with the unreacted amine or with the substituted amine. Since the hydrochloride is eliminated by subsequent reaction with strong caustic soda, it will be ignored and the reaction simply illustrated as follows:

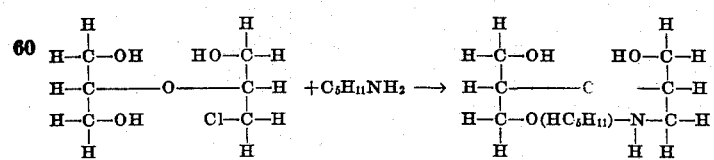

There is no reason to believe that higher glycerol ethers, such as triglycerol or the reaction products of diglycerol, and suitable glycols, such as ethylene glycol, could not be converted into chlorhydrins in the manner indicated. For purposes of convenience, reference is made to U. S. Patent No. 2,077,229, dated April 13, 1937, to Melvin De Groote and Arthur F. Wirtel. It is obvious that if an amine be indicated by the formula $N(R')_3$, then the previously described methods will yield ing an amine of the kind described and an acid ester of the kind aforementioned may be simplified by the following consideration: If the acid ester is derived from a dibasic carboxy acid, such as phthalic acid, then the residual product, that is, the acid ester, is nothing more nor less than a monocarboxy acid, which may be indicated by the formula R COOH. It has been previously pointed out that the amine of the kind employed for reaction with the acid body is of the kind indicated by the formula type $N(R')_3$, in which at least one occurrence of R' represents a radical of the kind illustrated by a dihydroxy propyl residue; and the other occurrences of R' may represent a hydrogen atom, an alkylol (monohydroxy alkyl) residue, an alkyl residue, an aralkyl residue, an aryl or an alicyclic residue. As to such amines containing an alkylol radical, it is to be noted that ethanolamine, propanolamine, diethanolamine, or dipropanolamine could be reacted with glycerol monochlorhydrin to give suitable amines.

The product obtained by neutralization of R COOH by $N(R')_3$ may be indicated by the following formula:

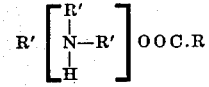

Such reactants may undergo an acylation reaction, as indicated in the following manner:

Reactions of the kind just described, i. e., a neutralization reaction or an acylation reaction, are not the kind of reactions which produce the reagent of the kind contemplated for use in the present process. Reagents of the kind contemplated for use in the present process must be derived from an acidic fatty acid body (acid ester) of the kind described and an amine of the kind described by a reaction involving at least one hydroxyl of the dihydroxy propyl group or groups or the equivalent thereof, even though reactions of the kind just described (neutralization and acylation) take place simultaneously or are involved in the same procedure prior to or after the esterification reaction. The reagent of the kind employed in the present process must be obtained by a reaction involving the following type of chemical activity:

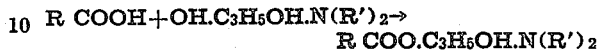

R COOH+OH.C3H5OH.N(R')2→
R COO.C3H5OH.N(R')2

Generally speaking, the desired product can be obtained in various manners. The first reaction between an acid body and an amine gives a salt type product of the kind shown above. Subsequent heating produces largely the ester type of material of the kind described as a demulsifying agent in the present process; and only at subsequently higher temperatures does one generally obtain the acylation product, although it may be formed in minor amounts at relatively low temperatures. The most convenient procedure is to employ a tertiary amine which eliminates the possibility of any acylation reaction, since there is no amino hydrogen atom available for reaction with the hydroxyl of any carboxyl radical present.

It is also desirable to emphasize the fact that in the formula of the amine N(R')3, where at least one occurrence of R' represents a dihydroxy propyl radical or its equivalent, the remaining occurrences of R' may represent a hydrogen atom, an alkyl radical, an alkylol radical, an aralkyl radical, an aryl radical, an alicyclic radical, and also an acyl radical derived from a detergent-forming carboxy acid, such as the higher fatty acids, rosin acids, such as abietic acid, hydrogenated abietic acid, and the like, and carboxy petroleum acids, such as naphthenic acids, chlornaphthenic acids, and the like. For instance, diglycerylamine may be treated with oleic acid so as to yield oleyl diglyceryl amine, and this product may be used just as effectively for example, as triglycerylamine. Needless to say, stearyl diglyceryl amine, ricinoleyl diglyceryl amine, naphthenyl diglyceryl amine, abietyl diglyceryl amine, and the like, could be employed just as effectively as triglyceryl amine. In some instances, such acylated amines are more desirable because they will enter into an esterification reaction, but not enter into either an acylation reaction or a neutralization reaction, due to their weaker basicity. Monoglycerylamine, of course, could be reacted with two molecules of oleic acid so as to produce bis-oleyl glycerylamine or bis-oleyl dihydroxy-propyl amine. Similarly, such mono-acylated or di-acylated products can be prepared from a variety of detergent-forming carboxy acids or their functional equivalents.

Where the amine containing the dihydroxy propyl group or its equivalent is a primary or a secondary amine, as, for example, monoglyceryl amine or diglyceryl amine, it has been pointed out previously that acylation reactions may occur involving the carboxy acid derived by reaction between the polybasic carboxy acid and the hydroxylated fatty acid body, i. e., the carboxy acid ester. This is simply another way of saying that a suitable primary or secondary amine, such as mono-glycerylamine or diglycerylamine, may be acylated by reaction with the acid ester derived from the polybasic carboxy acid; and the acylated amine thus obtained, still containing the dihydroxy propyl radical or radicals, may be reacted with additional proportions of the acid ester, derived from the polybasic carboxy acid and the hydroxylated fatty acid body, in the same manner that one would employ triglycerylamine, for example.

As an example of a suitable manufacturing method, the following description of the manner of preparing the preferred reagent is submitted:

Commercial castor oil, considered as containing 85% of triricinolein, is reacted with approximately 2½ moles of phthalic anhydride at approximately 140–170° C., so as to give a product consisting almost entirely of diphthalated and triphthalated triricinolein, with a small proportion of the monophthalated form present, and possibly even a little uncombined phthalic anhydride. One-third to one-fifth of the acidity of this product is removed by the addition of monoamyl diglycerylamine in the cold. The product is then heated to approximately 180° C. for about one to two hours with constant stirring and with the passage of dried $CO_2$ gas, so as to complete esterification reactions. At the completion of the period, the product should be completely neutral and generally the reaction should be conducted in such a manner as to have excess hydroxyl radicals which may be indicated by an acetyl value. The fact that the bulk of the amine has been converted into an ester is determined by the inability to liberate the amine by extraction with a strong mineral acid followed by treatment with a strong base, which would be possible, of course, if the mono-amyl diglycerylamine were present only in the salt form. Generally speaking, such tests should reveal that approximately 60–90% of the amine present is in a form other than the salt form. It is obvious, of course, that even though the amine be present in the esterified form, there is no objection to it also being present in the salt form, provided that the requirements as to the ester form have been completed. The amount of esterification can also be determined by the fact that only sufficient mono-amyl diglycerylamine was added originally to neutralize one-third to one-fifth of the acidic hydrogen atom present, but at the completion of the esterification process, the product is either neutral to phenolphthalein indicator or substantially neutral, and the disappearance of the acidic hydrogen atoms originally present, naturally must be due to esterification, since acylation, at least in the present instance where a tertiary amine is employed, could not take place. If the final product happens to be slightly acid—and this can happen readily in the case of a tricarboxylic acid such as citric acid—it may be left in the acid state. Generally speaking, and especially when a product is derived from a dibasic acid, such as phthalic acid, it may be better to add a fresh portion of monoamyl diglycerylamine, or even glycerol, and reheat the product for approximately one-half to one hour, at about 170° C. or thereabouts. In a general way, the most suitable reagents are obtained by reactions conducted in such a manner that the diphthalated and triphthalated triricinolein reaction involves only one hydroxyl of each of the dihydroxy propyl radical or radicals present in the amine. Any free carboxyl radicals if present may remain as such or may be eliminated by the addition of a secondary amount of the amine or glycol, as previously described, or may be eliminated by reaction with a suitable base, such as caustic soda, caustic potash, sodium carbonate, potassium carbonate, ammonium carbonate, ammonium hydroxide or the like, so as to convert the materials into the corresponding salts. Similarly, instead of ammonia, one may employ triethanolamine, diethanolamine, benzylamine, cyclohexylamine, monoamylamine, diamylamine, triamylamine, morpholine, or any other suitable amine.

Similarly, one may react the products of the kind described with calcium oxide, magnesium oxide, or the like, or one could produce heavy metal salts, such as iron salts, lead salts, etc. One could convert any free carboxyl hydrogen atoms into esters by reaction with alcohols, such as methyl alcohol, ethyl alcohol, propyl alcohol, butyl alcohol, amyl alcohol, hexyl alcohol, benzyl alcohol, cyclohexanol, cyclobutanol, etc. Some of the products derived in the manner previously described are substantially water soluble, others are oil soluble, and some are soluble both in oil and water; whereas certain species may show very limited solubility in either oil or water. The salt or ester form is considered as the functional equivalent of the acid form, and reference to the acid form in the claims is intended to include neutralized forms if present.

Excellent modifications of the preferred reagent above described are obtainable by replacing the monoamyl diglyceryl amine with equivalent amounts of triglyceryl amine, monoethanol diglyceryl amine, or diethanol monoglyceryl amine.

Obvious variations in the manufacture of the preferred reagent in view of the above suggested reactions indicate readily that one need not follow any fixed molecular proportion ratio in conducting reactions which involve esterification both of the hydroxylated fatty body and of the dihydroxy propyl radical or its equivalent. This is especially true in event that a tribasic acid, such as citric acid, replaces phthalic acid in the preparation of the preferred reagent. Thus, for example, two molecules of the residue derived from the hydroxylated fatty body may unite with the polybasic carboxy acid along with one molecule of the hydroxylated amine or one molecule of the fatty acid may be employed and two molecules of the hydroxylated amine. On the other hand, in the case of tri-citrated ricinolein, one might employ the molecular proportions of one fatty acid residue, three polybasic acid residues, and as many as six amine residues.

As a result of the previous discussion of the kind of the compounds which are formed during the manufacture of the preferred reagent, it might appear that there is some question as to the nature of the compounds which appear as a result of the reactions. This is not the case. In each instance a definite compound is formed having the characteristics of the kind described, but there may be as many as 20 or 30 or 40 different species formed as a result of a simple manufacturing procedure involving, for example, a mixture of monophthalated ricinolein, diphthalated ricinolein, or triphthalated ricinolein, with possibly some free phthalic acid or anhydride present, in conjunction with only one amine, for example, monoamyl diglyceryl amine. The following three formulas represent three possibilities which immediately present themselves as being formed in a reaction involving only monophthalated ricinolein.

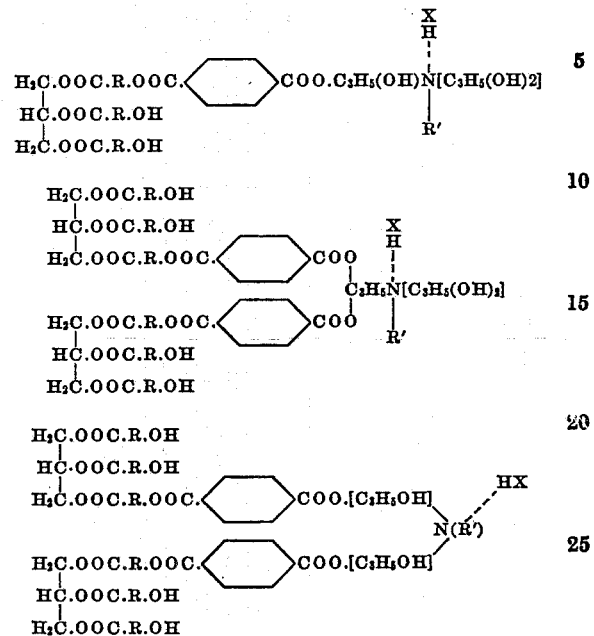

It is to be noted that the aromatic nucleus is represented as if derived from paraphthalic acid, whereas the ordinary anhydride or acid must, of course, be the ortho form. This is merely a matter of convenience in presenting the formulas. R' indicates the amyl radical $C_5H_{11}$. On examination of the second and third formulas, it is immediately plain that in either instance, one or two more monophthalated ricinolein molecules could be attached to the residual hydroxyls. In other words, one could have present a compound in which four molecules of monophthalated ricinolein were attached to one molecule, or rather, the dihydroxylated residue of one molecule of monoamyl diglycereyl amine. The dotted line connecting the nitrogen atom with HX simply indicates that HX is an acid which has combined by virtue of salt formation; i. e., the formation of a substituted ammonium salt, but not a quaternary ammonium salt, and thus comparable to the formation of aniline hydrochloride. HX may be present or it may be absent. This particular point is immaterial. HX could represent a mineral acid, but under conditions of manufacture, would be more apt to represent phthalic acid or a form of phthalated ricinolein. Similarly, it is to be noted that in a formula such as the first one, where the monovalent radical $[C_3H_5(OH)_2]$ appears as being available for further esterification, combination could take place with any available acid, not necessarily monophthalated ricinolein, for example. The acid might be phthalic acid or acetic acid, as indicated by the following two illustrations:

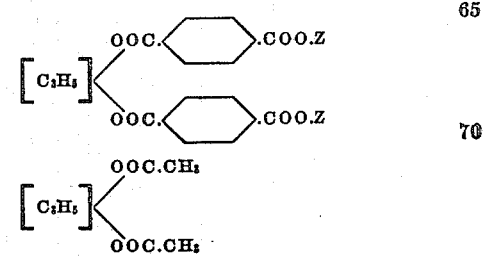

Similarly, in the third example, the divalent radical [C₃H₅OH] appears. In this instance, also, one hydroxyl could be replaced by a phthalic acid radical or by an acetic acid radical, as illustrated in the following formulas:

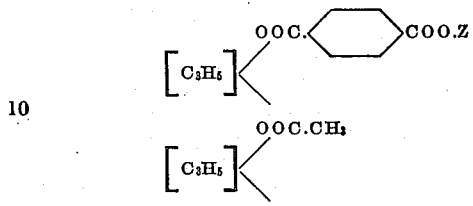

It is to be noted that in the previous formulas, the free carboxylic hydrogen of the phthalic acid radical has been replaced by the letter Z to indicate that the carboxylic hydrogen could be replaced by a metallic atom, an organic radical, such as an ethyl radical, or by an amine, such as amylamine. These facts emphasize that the replacement of any residual hydroxyl present in the amine at any position by an oxy-acyl radical derived from any kind of acid still leaves the product as the absolute and complete functional equivalent and yields just as effective a compound as if no replacement of the hydroxyl had taken place.

In view of what has been said previously in regard to monophthalated ricinoleic acid, one can at once see the variety of cogeners which are formed when diphthalated ricinolein and triphthalated ricinolein are also present. In such instances where diphthalated ricinolein or triphthalated ricinolein replaces monophthalated ricinolein, it is to be noted that compounds are readily obtainable of the kind characterized by the fact that more than one amine radical can be united with a single fatty acid body residue, as illustrated by the following formula:

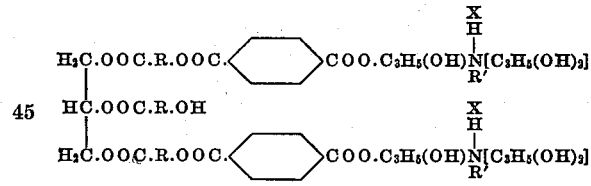

In view of the hundreds of compounds which can be produced, it is apparent that the description probably is dependent upon two procedures: first, describing the compound in terms of the essential radicals which may be present; and secondly, describing the compound in terms of a method of manufacture, which invariably and inevitably would produce at least a significant proportion of these particular compounds.

Conventional demulsifying agents employed in the treatment of an oil field emulsion are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the chemical compound employed as the demulsifying agent of my process may be admixed in connection with conventional demulsifying agents. Moreover, said chemical compound may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

In practicing my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

It is understood that the use of this process is not limited to any particular isomeric form in regard to any particular compound, or in regard to any particular group or radical entering into the compound or entering into the raw materials, from which the compound may be produced. As far as I am aware, one isomeric form is just as suitable as another isomeric form, and it is also obvious that in many instances, an obvious functional equivalent may replace one of the materials previously described. For instance, it is obvious that chlorinated triricinolein could be employed as a raw material, just as effectively as triricinolein, and would serve as a functional equivalent. Chlorphthalic acid, of course, could replace phthalic acid. Obviously morpholine and piperidine are the functional equivalents of an alkylamine in reaction with glycerol chlorhydrin.

Having thus described my invention, what I claim as new and desire to secure by Letters Patent is:

1. A process for breaking petroleum emulsions of the water-in-oil type, which consists in subjecting the emulsion to the action of a demulsifying agent comprising a chemical compound characterized by the presence in the molecule of: (a) at least one radical obtained by dehydroxylation of a hydroxylated fatty acid body; (b) at least one radical obtained by the elimination of at least two carboxylic hydrogen atoms of a polybasic carboxylic acid; and (c) at least one amine radical characterized by having present in place of at least one amino hydogen atom, a substituent radical obtained by dehydroxylation of a radical selected from the class consisting of poly-hydroxy alkyl and poly-hydroxy alkyl-oxy-alkyl radicals; and said molecule being further characterized by the fact that there is present at least one ester linkage involving at least one of the hydroxyl radicals of the poly-hydroxy amine component (c) above described and the polybasic acid radical (b) previously described.

2. A process for breaking petroleum emulsions of the water-in-oil type, which consists in subjecting the emulsion to the action of a demulsifying agent comprising a chemical compound characterized by the presence in the molecule of: (a) at least one radical obtained by dehydroxylation of a ricinoleic acid body; (b) at least one radical obtained by the elimination of at least two carboxylic hydrogen atoms of a polybasic carboxylic acid; and (c) at least one amine radical characterized by having present in place of at least one amino hydrogen atom, a substituent radical obtained by dehydroxylation of a radical selected from the class consisting of poly-hydroxy alkyl and poly-hydroxy alkyl-oxy-alkyl radicals; and said molecule being further characterized by the fact that there is present at least one ester linkage involving at least one of the hydroxyl radicals of the poly-oxy amine component (c) above described and the polybasic acid radical (b) previously described.

3. A process for breaking petroleum emulsions of the water-in-oil type, which consists in subjecting the emulsion to the action of a demulsifying agent comprising a chemical compound characterized by the presence in the molecule of: (a) at least one radical obtained by dehydroxylation of triricinolein; (b) at least one radical obtained by the elimination of at least two carboxylic hydrogen atoms of a polybasic carboxylic acid; and (c) at least one amine radical characterized by having present in place of at least one amino hydrogen atom, a substituent radical obtained by dehydroxylation of a radical selected from the class consisting of a poly-hydroxy alkyl and poly-hydroxy alkyl-oxy-alkyl radicals; and said molecule being further characterized by the fact that there is present at least one ester linkage involving at least one of the hydroxyl radicals of the poly-hydroxy amine component (c) above described and the polybasic acid radical (b) previously described.

4. A process for breaking petroleum emulsions of the water-in-oil type, which consists in subjecting the emulsion to the action of a demulsifying agent comprising a chemical compound characterized by the presence in the molecule of: (a) at least one radical obtained by dehydroxylation of triricinolein; (b) at least one radical obtained by the elimination of both carboxylic hydrogen atoms of a dibasic carboxylic acid; (c) at least one amine radical characterized by having present in place of at least one amino hydrogen atom, a substituent radical obtained by dehydroxylation of a radical selected from the class consisting of poly-hydroxy alkyl and poly-hydroxy-alkyl-oxy-alkyl radicals; and said molecule being further characterized by the fact that there is present at least one ester linkage involving at least one of the hydroxyl radicals of the poly-hydroxy amine component (c) above described and the dibasic acid radical (b) previously described.

5. A process for breaking petroleum emulsions of the water-in-oil type, which consists in subjecting the emulsion to the action of a demulsifying agent comprising a chemical compound characterized by the presence in the molecule of: (a) at least one radical obtained by dehydroxylation of triricinolein; (b) at least one radical obtained by the elimination of the two carboxylic hydrogen atoms of phthalic acid; (c) at least one amine radical characterized by having present in place of at least one amino hydrogen atom, a substituent radical obtained by dehydroxylation of a radical selected from the class consisting of poly-hydroxy alkyl and poly-hydroxy alkyl-oxy-alkyl radicals; and said molecule being further characterized by the fact that there is present at least one ester linkage involving at least one of the hydroxyl radicals of the poly-hydroxy amine component (c) above described, and the phthalic acid radical previously described.

6. A process for breaking petroleum emulsions of the water-in-oil type, which consists in subjecting the emulsion to the action of a demulsifying agent comprising a chemical compound characterized by the presence in the molecule of: (a) at least one radical obtained by dehydroxylation of triricinolein; (b) at least one radical obtained by the elimination of the two carboxylic hydrogen atoms of phthalic acid; (c) at least one amine radical characterized by having present in place of at least one amino hydrogen atom, a substituent radical obtained by dehydroxylation of a dihydroxy propyl radical; and said molecule being further characterized by the fact that there is present at least one ester linkage involving at least one of the hydroxyl radicals of the dihydroxy propyl radical component (c) above described, and the phthalic acid radical previously described.

7. A process for breaking petroleum emulsions of the water-in-oil type, which consists in subjecting the emulsion to the action of a demulsifying agent comprising a chemical compound characterized by the presence in the molecule of: (a) at least one radical obtained by dehydroxylation of triricinolein; (b) at least one radical obtained by the elimination of the two carboxylic hydrogen atoms of phthalic acid; (c) at least one amine radical characterized by having present in place of at least one amino hydrogen atom, a substituent radical obtained by dehydroxylation of a dihydroxy propyl radical; and said molecule being further characterized by the fact that there is present at least one ester linkage involving at least one of the hydroxyl radicals of the dihydroxy propyl radical component (c) above described and the phthalic acid radical previously described; and further characterized by the presence of at least one free uncombined hydroxyl radical in the molecule.

8. A process for breaking petroleum emulsions of the water-in-oil type, which consists in subjecting the emulsion to the action of a demulsifying agent of the kind obtainable by reaction between (a) a hydroxylated fatty acid body; and (b) a polybasic carboxylic acid, followed by subsequent reaction between the acid ester mass obtained by reaction between (a) and (b), and an amine characterized by having in place of at least one amino hydrogen atom, a substituent radical selected from the class consisting of poly-hydroxy alkyl and poly-hydroxy alkyl-oxy-alkyl radicals; said last described reaction being an esterification reaction involving at least one hydroxyl radical of the aforementioned poly-hydroxylated component.

9. A process for breaking petroleum emulsions of the water-in-oil type, which consists in subjecting the emulsion to the action of a demulsifying agent of the kind obtainable by reaction between (a) a ricinoleic acid body; and (b) a polybasic carboxylic acid, followed by subsequent reaction between the acid ester mass obtained by reaction between (a) and (b), and an amine characterized by having in place of at least one amino hydrogen atom, a substituent radical selected from the class consisting of poly-hydroxy alkyl and poly-hydroxy alkyl-oxy-alkyl radicals; said last described reaction being an esterification reaction involving at least one hydroxyl radical of the aforementioned polyhydroxylated component.

10. A process for breaking petroleum emulsions of the water-in-oil type, which consists in subjecting the emulsion to the action of a demulsifying agent of the kind obtainable by reaction between (a) triricinolein; and (b) a polybasic carboxylic acid, followed by subsequent reaction between the acid ester mass obtained by reaction between (a) and (b), and an amine characterized by having in place of at least one amino hydrogen atom, a substituent radical selected from the class consisting of poly-hydroxy alkyl and poly-hydroxy alkyl-oxy-alkyl radicals; said last described reaction being an esterification reaction involving at least one hydroxyl radical of the aforementioned polyhydroxylated component.

11. A process for breaking petroleum emulsions of the water-in-oil type, which consists in subjecting the emulsion to the action of a demulsifying agent of the kind obtainable by reaction between (a) triricinolein; and (b) a dibasic carboxylic acid, followed by subsequent reaction between the acid ester mass obtained by reaction between (a) and (b), and an amine characterized by having in place of at least one amino hydrogen atom, a substituent radical selected from the class consisting of poly-hydroxy alkyl and poly-hydroxy alkyl-oxy-alkyl radicals; said last described reaction being an esterification reaction involving at least one hydroxyl radical of the aforementioned polyhydroxylated component.

12. A process for breaking petroleum emulsions of the water-in-oil type, which consists in subjecting the emulsion to the action of a demulsifying agent of the kind obtainable by reaction between (a) triricinolein; and (b) phthalic acid body selected from the class consisting of phthalic acid and its anhydride; followed by subsequent reaction between the acid ester mass obtained by reaction between (a) and (b), and an amine characterized by having in place of at least one amino hydrogen atom, a substituent radical selected from the class consisting of poly-hydroxy alkyl and poly-hydroxy alkyl-oxy-alkyl radicals; said last described reaction being an esterification reaction involving at least one hydroxyl radical of the aforementioned polyhydroxylated component.

13. A process for breaking petroleum emulsions of the water-in-oil type, which consists in subjecting the emulsion to the action of a demulsifying agent of the kind obtainable by reaction between (a) triricinolein; and (b) a phthalic acid body selected from the class consisting of phthalic acid and its anhydride; followed by subsequent reaction between the acid ester mass obtained by reaction between (a) and (b), and an amine characterized by having in place of at least one amino hydrogen atom, a dihydroxy propyl radical; said last described reaction involving at least one hydroxyl of the aforementioned dihydroxy propyl radical component.

14. A process for breaking petroleum emulsions of the water-in-oil type, which consists in subjecting the emulsion to the action of a demulsifying agent of the kind obtainable by reaction between (a) triricinolein; and (b) a phthalic acid body selected from the class consisting of phthalic acid and its anhydride; followed by subsequent reaction between the acid ester mass obtained by reaction between (a) and (b), and an amine characterized by having in place of at least one amino hydrogen atom, a dihydroxy propyl radical; said last described reaction involving at least one hydroxyl of the aforementioned dihydroxy propyl radical component and said reactions being conducted in a manner so that the final product is characterized by the presence of at least one free hydroxyl radical.

MELVIN DE GROOTE.

CERTIFICATE OF CORRECTION.

Patent No. 2,127,905.                              August 23, 1938.

MELVIN DE GROOTE.

It is hereby certified that error appears in the printed specification of the above numbered patent requiring correction as follows: Page 3, first column, lines 58 to 65 inclusive, for that portion of the formula reading "O(HC$_5$H$_{11}$)" read OH(C$_5$H$_{11}$); page 4, second column, line 75, for "glycol" read glycerol; and that the said Letters Patent should be read with this correction therein that the same may conform to the record of the case in the Patent Office.

Signed and sealed this 11th day of October, A. D. 1938.

(Seal)                                              Acting Commissioner of Patents.